Nov. 4, 1930.  A. PAPÒ ET AL  1,780,311
MOVING PICTURE MACHINE
Filed Sept. 9, 1925
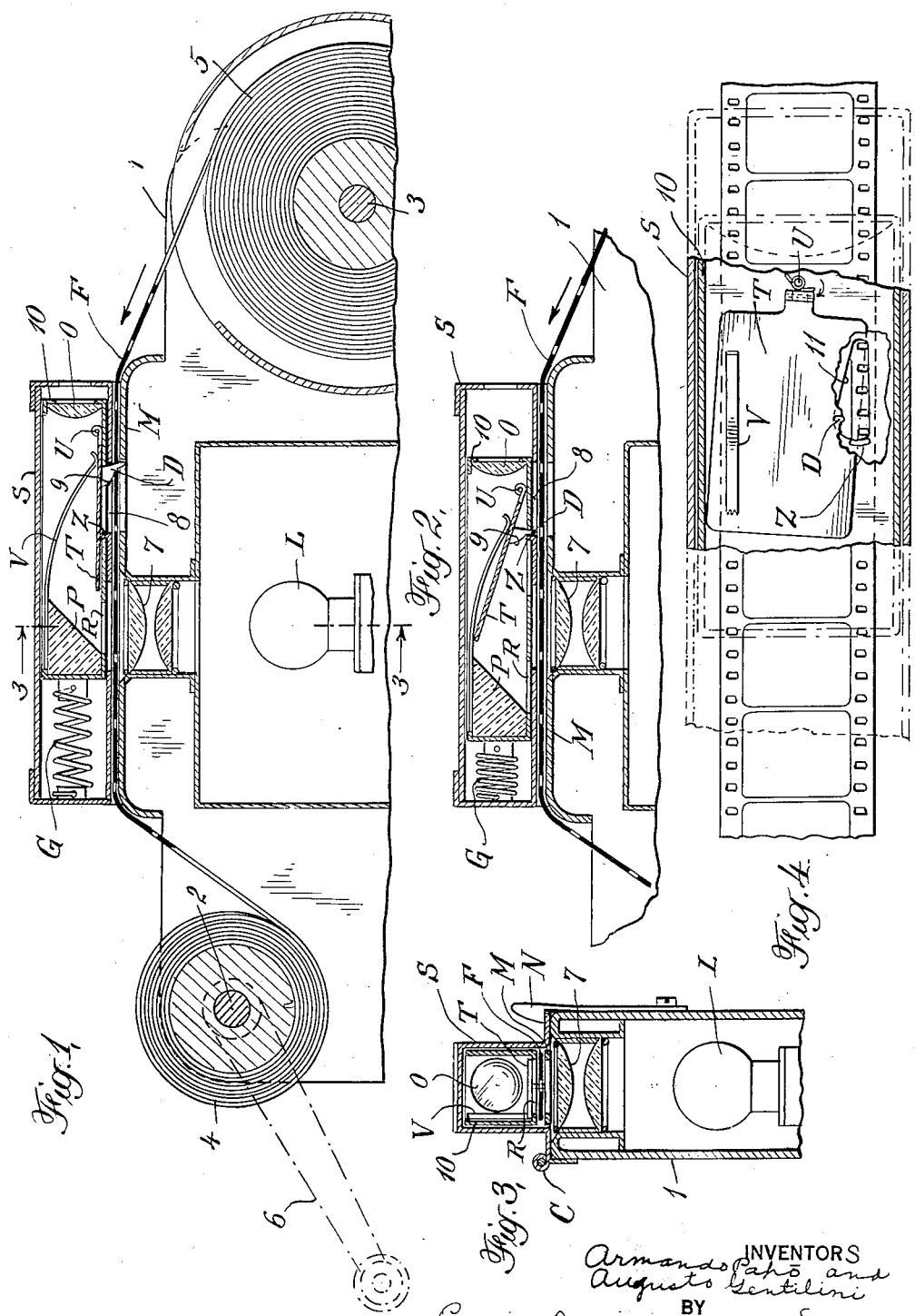
INVENTORS
Armando Papò and
Augusto Gentilini
BY
Pennie, Davis, Marvin & Edmonds
their ATTORNEYS Patented Nov. 4, 1930

1,780,311

UNITED STATES PATENT OFFICE

ARMANDO PAPŌ AND AUGUSTO GENTILINI, OF ROME, ITALY

MOVING-PICTURE MACHINE

Application filed September 9, 1925. Serial No. 55,260.

This invention relates to motion picture machines and has for its object to provide a machine of this character of exceedingly simple construction which, nevertheless, produces a bright, steady picture even with a light of low intensity.

The machine is designed primarily for narrow film such as is now coming into use with the so-called "home" and amateur machines, but is also adapted for the full size or standard film used in professional machines.

The invention may be employed in either a camera or a projector, but is primarily intended for the latter, and such application of the invention is hereinafter shown and described.

In the accompanying drawings we have shown in Figs. 1, 2 and 3 a projector utilizing the small film above referred to, which film has a single perforation for each picture, the perforations being placed in the middle of the film between the pictures.

In these figures,

Fig. 1 is a vertical longitudinal section of the entire machine showing the parts in the positions they occupy during the interval of projection;

Fig. 2 is a similar view of the film-feeding and projecting mechanism showing the parts in the positions they occupy during the interval that the light is cut off from the screen;

Fig. 3 is a transverse section on line 3—3 of Fig. 1; and

Fig. 4 is a detail view showing the machine as modified for standard or other film having a plurality of perforations for each picture.

The machine comprises a narrow box or cabinet 1 adapted to be mounted on a suitable support (not shown) and provided at each end with spindles 2 and 3 for the film reels 4 and 5, respectively. The reel 4 on which the film is wound is provided with a crank handle 6 which is operated continuously by the user during the projection of the picture.
Supported in the cabinet near the top edge of the side walls thereof is a condenser 7 of a diameter substantially double the longitudinal dimension of the individual pictures of the film, and supported below the condenser in any suitable manner is a projecting lamp L, preferably an incandescent electric lamp of moderate candle power.

The upper wall of the cabinet is formed by a metal plate M shaped to form a guide for the film F and cut away as shown over the condenser to permit the passage of light through the film as it is fed across the top of the casing by the rotation of the driving crank 6.

Hinged to one side wall of the cabinet, as shown at C, Fig. 3, is a square box-like member S which, when the machine is in operation is maintained closed over the film in the position shown by a latch N. The box S constitutes a guideway for a reciprocating sheet metal frame 10 having at one end a reflecting prism P and at the other end a projection lens O, both the prism and the lens being fixedly supported in the frame or carriage 10 whereby their relative positions are not altered during the operation of the machine.

Mounted in the box S between the carriage 10 and rear end wall of the box is a compression spring G which tends normally to advance the carriage toward the right, or in a direction opposite the movement of the film. Pivoted at U in the carriage 10 back of the lens O is a pawl T having a tooth D which projects through a hole in the bottom wall of the carriage 10, also through a slot in the bottom wall of the box S, this slot being about the length of the longitudinal dimension of the individual pictures of the film. The pawl T is held by a light spring V lightly pressed against the surface of the film, whereby the tooth D will enter the perforations of the film as the latter is drawn through the machine and will cause the frame 10 to move with the film against the tension of the spring G until the pawl is released. During this movement the parts occupy the positions shown in Fig. 1, and it is during this movement that the picture is projected on the screen. As will be seen, the light from the lamp L is directed by the condenser through the portion of the film lying above the condenser and thence on to the reflector P, whence the light is directed through the projecting lens O on to the screen which is supported at the right of the machine at the proper distance to produce the picture of the desired dimensions. The passage of light through the carriage 10 is permitted by the slot R which underlies the reflecting face of the prism and serves as a mask to block off the light passing through the perforations and the adjacent parts of the film as the film advances over the condenser. During the interval of projection the pawl T which is extended beyond the tooth in the manner shown, lies flat within the carriage 10 and therefore out of the path of light reflected from the prism. The spring V lies to one side of the path of light or, if desired, separate springs may be provided at each side of the frame.

After a movement of the carriage with the film through a distance slightly less than the distance from center to center of successive pictures, that is, the distance from the cam Z to the other end of the tooth-opening in the bottom of box S, best seen in Fig. 1, the pawl D is released from the film and the carriage allowed to return under the action of the spring G into position for the pawl to engage the next succeeding perforation in the film. For the purpose of releasing the pawl we have provided a projection Z formed by turning up the metal of the box S at the end of the slot 8, which projection engages a cam 9 or fillet formed on the back of the tooth D. This cam rides up on the projection Z as the carriage 10 reaches the end of its movement, thereby elevating the pawl to the position shown in Fig. 2 and releasing the tooth D from engagement with the film. In this position of the pawl T the portion of the pawl which projects beyond the tooth D in the form of a flat plate serves as a shutter to intercept the light between the prism P and the projecting lens O, thereby obscuring the picture during the return movement of the carriage 10 by the spring G. As soon as the carriage is returned far enough for the fillet to move off the projection Z the end of the pawl will rest lightly against the face of the film in position to drop into the next projection between the pictures, when the cycle of operations will be repeated.

As the parts of the carriage are small and light, being preferably formed of sheet metal, the spring G need not be strong in order to effect a rapid return movement of the carriage. In fact, the resistance afforded by the spring is much less than the frictional resistance to the intermittent motion of the film in the ordinary projecting machine and the wear of the film in the present machine is materially less than with the ordinary intermittent feed type. Furthermore, the interval of projection is relatively much greater than the period of return movement. In the ordinary machine in which the intermittent sprocket is operated by a Geneva gear the interval of projection occupies three-quarters of the complete cycle of operations, whereas in our improved machine the return movement of the carriage need not occupy more than one-eighth or one-tenth the cycle.

By reason of the fact that the film directly engages and operates the reflector and lens-supporting carriage the machine produces a clear and steady picture, although made entirely of light metal stampings instead of accurately machined parts as required for projectors of this type wherein the movable member of the optical system and the film are separately operated through correlated gears and other mechanical movements. In such machines the wear of the bearings, etc. of the mechanical parts directly affects the definition of the picture and can only be corrected by constantly maintaining very accurate adjustment of the parts. In the present machine the wear of the parts has no effect whatsoever on the definition of the picture.

In Fig. 4 we have illustrated the slight modification necessary to adapt the machine for film having a plurality of marginal perforations for each picture. In the machine for this purpose the tooth D will be positioned at one side of the pawl T and the slot in the bottom wall of the box S will be shaped as shown in Fig. 4. Also, the pawl will be loosely mounted at U and will be provided with a supplementary spring tending to shift the pawl laterally of the carriage.

In operation the carriage 10 will be fed by the film in the direction of the arrow in the usual manner, but when the pawl is released by the projection Z the supplemental spring will shift the pawl slightly toward the middle of the carriage out of alignment with the perforations in the margin of the film. As the carriage is returned by the spring D the edge of the pawl will engage the inclined edge 11 of the opening and will be shifted sidewise so that when the carriage reaches the end of its return movement the pawl will enter the perforation at the end of the opening.

In order to facilitate the rewinding of the film both spindles 2 and 3 may be provided with connections for the crank handle 6. When it is desired to rewind the film it is only necessary to turn the box S back on its hinge C to thereby remove the pawl from engagement with the film and rotate the spindle 2 in a direction to wind up the film before removing the reel from the machine.

We claim:

1. In a motion picture machine the combination of an optical system having a portion of its optical axis parallel with the plane of the film, and including a reflector properly spaced from a projecting lens, said system being adapted to be moved in synchronism with the film during the projection of the picture, means for moving said reflector comprising a film-engaging member carried thereby adapted to be engaged directly by the film and transmit the movement of the film to said reflector, said reflector registering intermittently with said picture to transmit light to said projecting lens, and means for continuously advancing said film.

2. In a moving picture machine the combination of a source of light, means for continuously advancing a perforated film across said source of light, a reflector mounted for reciprocatory movement in parallelism with said film, and means for effecting the movement of said reflector comprising a pawl mounted in substantial parallelism with said film and having a tooth for engagement with a perforation in said film, means for disengaging said pawl from said perforation at a predetermined point in the movement of said reflector, a spring for moving said reflector in a direction opposite to the movement of the film whereby said reflector is returned to register with a picture on said film when said picture registers with the source of light, said pawl being free for engagement with another perforation of the film after a return movement of predetermined amplitude.

3. In a motion picture machine the combination of an optical system having a portion of its optical axis parallel with the plane of the film, a reflector to be moved in synchronism with the film during the projection of the picture and so mounted in the optical system as to reflect on the screen the pictures transmitted thereto from the film, when said pictures register with said light, means for moving said reflector comprising a film-engaging member carried thereby adapted to be engaged directly by the film and transmit the movement of the film to said reflector, means for continuously advancing said film, and a projection lens fixedly connected to said reflector in spaced relation thereto, and supported with its optical axis substantially parallel to the film.

4. In a motion picture machine the combination of an optical system having a portion of its optical axis parallel with the plane of the film, a source of light, a reflector mounted in the portion of the system parallel to the film for reciprocation in synchronism with the passage of the film to be moved in synchronism with the film during the projection of the picture whereby said reflector registers with the light transmitted from said film to project the pictures thereon when said pictures register with said source of light, means for moving said reflector comprising a film-engaging member carried thereby adapted to be engaged directly by the film and transmit the movement of the film to said reflector, means for continuously advancing said film, and a shutter hinged to the reciprocating frame operating in synchronism with the movement of said reflector for cutting off the light therefrom on the return movement of the reflector.

5. In a moving picture machine, the combination of a source of light, means for continuously advancing a perforated film across said source of light, a frame coextensive with the film inserted in the machine, a reflector mounted in said frame for reciprocatory movement in parallelism with said film, means on said reflector mounting for effecting the movement of said reflector comprising a pawl mounted in said reflector-frame in substantial parallelism with said film and having a tooth for engagement with a perforation in said film, means on the reflector mounting for disengaging said pawl from said perforation at a predetermined point in the movement of said reflector, a spring for moving said reflector in a direction opposite to the movement of the film whereby said reflector registers with a picture on said film when said picture registers with said source of light, said pawl being free for engagement with another perforation of the film after a return movement of predetermined amplitude, and means for preventing the engagement of said pawl when the perforation in the film is in advance of the perforation having the proper spaced relation with the previously engaged perforation.

6. In a moving picture machine, the combination of a source of light, means for continuously advancing a perforated film across said source of light, a reflector mounted for reciprocatory movement in parallelism with said film and adapted to reflect a picture on said film onto a screen when said picture and said source of light register with each other, means for effecting the movement of said reflector comprising a pawl having a tooth for engagement with a perforation in said film, means for disengaging said pawl from said perforation at a predetermined point in the movement of said reflector, a spring for moving said reflector in a direction opposite to the movement of the film, said pawl being free for engagement with another perforation of the film after a return movement of predetermined amplitude, and a shutter plate held out of the path of the light while said tooth is in engagement with the film and adapted to be raised by said disengaging means to cut off the light from the reflector when the pawl is out of engagement with the film.

7. In a motion picture machine, the combination of a film guideway, means for continuously advancing a perforated film therethrough, a source of illumination, means for directing the light therefrom through said film in its passage through the guideway, a frame mounted on said machine upon said guideway adapted to enclose said film a member within said frame for reciprocation in a plane substantially parallel to the film, a reflector carried in one end of said reciprocating member and adapted to reflect transmitted light from said film when a picture thereof registers with said source of illumination, a projecting lens at the other end of said reciprocating member, means for operating said reciprocating member comprising a pawl enclosed in said reciprocating member and having a tooth extending into engagement with the perforation of the film to effect the movement of said reciprocating member, lens and reflector, means on said frame for releasing said tooth, and a member for returning the reciprocating member, lens and reflector, after release of said tooth, into position for said tooth to engage a perforation in the film in properly spaced relation with the succeeding picture of the film to be exhibited.

8. In a motion picture machine, the combination of a film guideway, means for continuously advancing a centrally perforated film therethrough, a source of illumination, means for directing the light therefrom through said film in its passage through the guideway, a frame mounted on said machine over said guideway adapted to enclose said film throughout its extent in the machine, a member within said frame for reciprocation in a plane substantially parallel to the length of film in the machine, a reflector carried in one end of said reciprocating member, said reflector registering with a picture on said film when the picture registers with the source of illumination, a projecting lens at the other end of said reciprocating member, means for operating said reciprocating member comprising a pawl in said reciprocating member extending substantially parallel to the film and having a tooth extending through said reciprocating member and said frame for engagement with the central perforations of the film to effect the movement of said reciprocating member, lens and reflector in syncronized relation therewith, means on said frame and projecting into said reciprocating member for releasing said tooth, and a spring for returning the reciprocating member, lens and reflector, after the release of said tooth, into position to engage another central perforation in the film in properly spaced relation with the succeeding picture.

9. In a motion picture machine, a film guideway, means for continuously advancing a centrally perforated film therethrough, a frame mounted on said guideway and enclosing the portion of the film in the machine, a member enclosed within said frame and adapted for reciprocation parallel to the film, a reflector carried in one end of said member and registering with a picture on said film when said picture registers with said source of illumination, a projecting lens at the other end of said member, a pawl in said member, said pawl having a tooth extending into engagement with the perforations in said film to reciprocate said member as the film is moved through the machine, means on the frame for releasing said tooth, means for returning the reciprocating member into position to engage another perforation in the film, and a shutter plate carried by said pawl and adapted to be pushed up into the image-rays by said tooth releasing member when the pawl disengages the film.

10. In a motion picture machine, the combination of an optical system including a reflector properly spaced from a projecting lens, said system being adapted to be moved according to the movement of the film during the projection of the picture, means for moving said system comprising a film-engaging member carried thereby adapted to be engaged by the film and transmit the movement of the film to said reflector, said reflector registering on occasion with said picture to transmit light to said projecting lens, and means for continuously advancing said film.

11. In a motion picture machine, the combination of a source of light, an optical system, including a reflector properly spaced from a projecting lens said system being mounted for reciprocation in accordance with the passage of the film during the projection of the picture, means for moving said system comprising a film engaging member carried thereby adapted to be engaged directly by the film and transmit the movement of the film to said reflector, means for continuously advancing said film, and shutter-means on the reciprocating frame adapted for operation in synchronism with the movement of said reflector for cutting off the light therefrom from the projecting lens on the return movement of the reflector.

12. In a motion picture machine, the combination of an optical system having a portion of its axis parallel with the plane of the film, and including a reflector properly spaced from a projecting lens, means for moving said system comprising a film engaging member carried thereby adapted to be engaged directly by the film and transmit the movement of the film to said reflector, said reflector registering with said picture to transmit light to said projecting lens, and means for continuously advancing said film.

13. In a motion picture machine, the combination of an optical system including a reflector properly spaced from a projecting lens, said system being adapted to be moved in synchronism with the film during the projection of the picture, means for moving said system comprising a film-engaging member carried thereby and adapted to be positively engaged by the film and transmit the movement of the film to said reflector, and means for continuously advancing said film.

14. In a moving picture machine, the combination of a source of light, means for continuously advancing a perforated film across said source of light, a reflector mounted for reciprocatory movement across said source of light, means for effecting the movement of said reflector, comprising a pawl mounted near the film and having a formation for engagement with said film, means for disengaging the pawl from the film at a predetermined point of the movement of the reflector, and means for moving said reflector in such a direction in relation to the movement of the film that said reflector returns to register with a picture on said film when said picture registers with the source of light.

15. In a motion picture machine, the combination of an optical system including a reflector adjacent the film, means for moving said film continuously through the machine said reflector being movable by the movement of the film during the projection of the picture whereby said reflector registers with a picture on said film when said picture registers with the source of light, means for moving said reflector comprising a film-engaging member carried thereby and adapted to be engaged by the film to transmit the movement thereof to the reflector, and another member of the optical system connected to said reflector in spaced relation thereto and supported with its optical axis substantially parallel to the film.

16. In a motion-picture machine, the combination of an optical system including a reflector and a projector mounted in spaced relation thereto, means for moving said system comprising a member carried thereby and adapted to be engaged by the film to transmit the movement thereof to the system, means for continuously advancing the film, means for disengaging said member from said film at a predetermined point in the movement of said system, and means for preventing the engagement of said member with said film when the perforation in the film is in advance of the perforation having the proper spaced relation with the previously engaged perforation.

17. In a motion-picture machine, the combination of an optical system including a reflector and a projector mounted in spaced relation thereto, means for moving said system comprising a member carried thereby and adapted to be engaged by the film to transmit the movement thereof to the system, means for continuously advancing the film, means for disengaging said member from said film at a predetermined point in the movement of said reflector, and means for preventing the engagement of said member with said film when the perforation in the film is in advance of the perforation having the proper spaced relation with the previously engaged perforation, and a shutter-member carried by said first member and adapted to be raised by said disengaging means to cut off the light from the reflector when said first member is out of engagement with the film.

18. A motion picture machine having means for continuously advancing a film therethrough, an optical system including a reflector mounted in spaced relation to a projector, said system being mounted in the machine for reciprocation by and over the film to project the pictures, means in said system for engaging with the film, and a member between said projector and said reflector in said system for disengaging said engaging means at a predetermined point in the movement of the reflector.

19. A motion picture machine having means for continuously advancing a film therethrough, an optical system including a reflector mounted in spaced relation to a projector, said system being mounted in the machine for reciprocation by and over the film to project the pictures, means in said system for engaging with the film, and a member between said projector and said reflector in said system for disengaging said engaging means at a predetermined point in the movement of the reflector, means for returning said reflector to its original position, and means in said system between said reflector and said projector for cutting off the light from the projector on the return movement of the reflector.

20. A motion picture machine having means for continuously advancing a film therethrough, an optical system including a reflector mounted in spaced relation to a projector, said system being mounted in the machine for reciprocation by and over the film to project the pictures, means in said system for engaging with the film, and a member between said projector and said reflector in said system for disengaging said engaging means at a predetermined point in the movement of the reflector, means for returning said reflector to its original position, means in said system between said reflector and said projector for cutting off the light from the projector on the return movement of the reflector, and means for preventing the engagement of said reciprocating means when the perforation in the film is in advance of the perforation having the proper spaced relation to the previously engaged perforation.

21. A motion picture machine made of light metal stampings and having an optical system including a reflector and a projector mounted therein in spaced relation thereto, and having a structure for producing intermittent registration of the reflector with the pictures, said structure comprising means for continuously moving a film through the machine, a carriage-part mounted in the machine longitudinally of the film and being adapted for intermittent movement by the continuous movement of the film, film-engaging means on said carriage-part for moving said carriage part, means for releasing said film-engaging member after an advance of said carriage part corresponding to one picture of the film, and means for returning said carriage-part to position for engagement with the next succeeding picture of the film.

22. A motion picture machine made of light metal stampings and having an optical system including a reflector and a projector mounted therein in spaced relation thereto, and having a structure for producing intermittent registration of the reflector with the pictures, said structure comprising means for continuously moving a film through the machine, a carriage-part mounted in the machine longitudinally of the film and being adapted for intermittent movement by the continuous movement of the film, a film-engaging member on said carriage-part for moving said carriage-part, means for releasing said film-engaging member after an advance of said carriage part corresponding to one picture of the film, and means for returning said carriage part to position for engagement with the next succeeding picture of the film, and means on said carriage-structure operating in synchronism with the movement of said carriage-part for cutting off the light from said projector on the return movement of the carriage-part.

23. A motion picture machine made of light metal stampings and having an optical system including a reflector and a projector mounted therein in spaced relation thereto, and having a structure for producing intermittent registration of the reflector with the pictures, said structure comprising means for continuously moving a film through the machine, a carriage-part mounted in the machine longitudinally of the film and being adapted for intermittent movement by the continuous movement of the film, a film-engaging member on said carriage-part for moving said carriage-part, means for releasing said film-engaging member after an advance of said carriage-part corresponding to one picture of the film, and means for returning said carriage-part to position for engagement with the next succeeding picture of the film, and a member on the frame of the machine for preventing the engagement of said film-engaging means with the film when the perforation in the film is in advance of the perforation having the proper spaced relation with the previously engaged perforation.

In testimony whereof we affix our signatures.

ARMANDO PAPŌ.
AUGUSTO GENTILINI.